(12) United States Patent
Lee et al.

(10) Patent No.: US 9,104,191 B2
(45) Date of Patent: Aug. 11, 2015

(54) PROCESS FOR PREPARATION OF QUADRANGLE UNIT

(75) Inventors: Hokyung Lee, Daejeon (KR); Eungjin Jang, Cheongju-si (KR); Kyu Hwang Lee, Daejeon (KR); Yoomin Lee, Chungcheongbuk-do (KR); Hoonyeol Kim, Chungcheongbuk-do (KR)

(73) Assignee: LG CHEM, LTD., Seoul (KR)

( * ) Notice: Subject to any disclaimer, the term of this patent is extended or adjusted under 35 U.S.C. 154(b) by 767 days.

(21) Appl. No.: 13/255,591

(22) PCT Filed: Mar. 10, 2010

(86) PCT No.: PCT/KR2010/001505
§ 371 (c)(1),
(2), (4) Date: Dec. 20, 2011

(87) PCT Pub. No.: WO2010/104330
PCT Pub. Date: Sep. 16, 2010

(65) Prior Publication Data
US 2012/0078406 A1    Mar. 29, 2012

(30) Foreign Application Priority Data

Mar. 10, 2009    (KR) .................. 10-2009-0020457

(51) Int. Cl.
*G06F 19/00*    (2011.01)
*G05B 19/18*    (2006.01)
(Continued)

(52) U.S. Cl.
CPC ............ *G05B 19/18* (2013.01); *B23K 26/0604* (2013.01); *B23K 26/0673* (2013.01);
(Continued)

(58) Field of Classification Search
CPC ............... G06Q 10/04; B26D 26/0604; B26D 26/0673; B26D 26/38; B26D 5/007; B26D 5/00; G05B 19/18; G05B 2219/35215; B26F 3/004
USPC .................... 715/244–245; 700/103, 171, 299
See application file for complete search history.

(56) References Cited

U.S. PATENT DOCUMENTS 3,931,501 A * 1/1976 Barr et al. ...................... 700/171
3,942,021 A * 3/1976 Barr et al. ................ 250/559.44
(Continued)

FOREIGN PATENT DOCUMENTS

JP    5-61515 A    3/1993
JP    6-31693 A    2/1994
(Continued)

OTHER PUBLICATIONS

Vassiliadis, "Two-dimensional stock cutting and rectangle packing: binary tree model representation for local search optimization methods", Nov. 26, 2044, pp. 257-268.*
(Continued)

*Primary Examiner* — Kenneth M Lo
*Assistant Examiner* — Olvin Lopez Alvarez
(74) *Attorney, Agent, or Firm* — Birch, Stewart, Kolasch & Birch, LLP

(57) ABSTRACT

Disclosed herein is a method of cutting one or more kinds of quadrangular unit pieces having a relatively small size from a quadrangular base material having a relatively large size using a cutter frame including a plurality of cutters to manufacture the quadrangular unit pieces, the method including (a) an inspection step of scanning a quadrangular base material in a longitudinal direction and in a lateral direction of the quadrangular base material to check positions of defects on the quadrangular base material, (b) a calculation step of calculating a yield when imaginarily cutting the quadrangular base material using two or more kinds of cutting frames, (c) a selection step of selecting one of the cutting frames in which the yield calculated at the calculation step (b) is within a range of upper 30%, and (d) a manufacturing step of cutting the quadrangular base material using the cutting frame selected at the selection step (c) to manufacture quadrangular unit pieces.

18 Claims, 5 Drawing Sheets

(51) Int. Cl.
*G06Q 10/04* (2012.01)
*B23K 26/06* (2014.01)
*B23K 26/067* (2006.01)
*B23K 26/38* (2014.01)
*B26D 5/00* (2006.01)
*B26F 3/00* (2006.01)

(52) U.S. Cl.
CPC . *B23K26/38* (2013.01); *B26D 5/00* (2013.01); *B26D 5/007* (2013.01); *G06Q 10/04* (2013.01); *B26F 3/004* (2013.01); *G05B 2219/35215* (2013.01)

(56) References Cited

U.S. PATENT DOCUMENTS

| | | | | |
|---|---|---|---|---|
| 5,757,950 | A | * | 5/1998 | Bruder ............ 382/111 |
| 5,796,401 | A | * | 8/1998 | Winer ............. 345/619 |
| 6,690,990 | B1 | * | 2/2004 | Caron et al. ......... 700/171 |
| 6,941,864 | B2 | * | 9/2005 | Dick et al. .......... 101/483 |
| 8,010,216 | B2 | * | 8/2011 | Roise ............. 700/100 |
| 8,031,321 | B2 | * | 10/2011 | Kim et al. .......... 349/187 |
| 8,120,604 | B2 | * | 2/2012 | Kinoshita et al. ....... 345/419 |
| 8,175,735 | B2 | * | 5/2012 | Wang et al. ......... 700/103 |
| 8,219,236 | B2 | * | 7/2012 | Moisio et al. ........ 700/122 |
| 8,244,394 | B2 | * | 8/2012 | Nagy et al. ......... 700/157 |
| 8,489,986 | B2 | * | 7/2013 | Haug et al. ......... 715/244 |
| 8,596,461 | B2 | | 12/2013 | Susnjara ........... 209/3.3 |
| 2001/0039892 | A1 | | 11/2001 | Frossard et al. |
| 2004/0134231 | A1 | * | 7/2004 | Oya ............. 65/29.11 |
| 2005/0240300 | A1 | * | 10/2005 | Sigtryggsson et al. ..... 700/171 |
| 2006/0174568 | A1 | * | 8/2006 | Kinoshita et al. ....... 52/395 |
| 2007/0112451 | A1 | * | 5/2007 | Clayton et al. ........ 700/100 |
| 2010/0206146 | A1 | | 8/2010 | Lee et al. |
| 2010/0236371 | A1 | * | 9/2010 | Lee et al. .......... 83/651 |
| 2010/0288100 | A1 | * | 11/2010 | Lee et al. .......... 83/859 |
| 2011/0048209 | A1 | * | 3/2011 | Lee et al. .......... 83/651 |
| 2011/0056354 | A1 | * | 3/2011 | Lee et al. .......... 83/177 |
| 2013/0078891 | A1 | * | 3/2013 | Lee et al. .......... 451/41 |

FOREIGN PATENT DOCUMENTS

| | | | |
|---|---|---|---|
| JP | 9-128422 A | | 5/1997 |
| JP | 11-319944 A | | 11/1999 |
| JP | 2000-29915 A | | 1/2000 |
| JP | 2006-5186 A | | 1/2006 |
| KR | 10-2001-0086607 A | | 9/2001 |
| KR | 10-0803937 B1 | | 2/2008 |
| KR | 10-2008-0033863 A | | 4/2008 |
| KR | 10-2009-0008088 A | | 1/2009 |
| TN | 487643 B | | 5/2002 |
| WO | WO 2007/058023 A1 | | 5/2007 |
| WO | WO 2009/011518 * | 1/2009 | ...... D06H 7/10 |
| WO | WO 2009/014405 A2 | | 1/2009 |
| WO | WO 2009/031777 A2 | | 3/2009 |

OTHER PUBLICATIONS

Tsai et al, "An optimization algorithm for cutting stock problems in the TFT-LCD industry" Mar. 24, 2009, pp. 913-919.*
Wang, "Batchless Layout Optimization Used in the Glass Tempering Process", Dec. 2007, pp. 109-114.*
Ronnqvist et al, "Integrated defect detection and optimization for cross cutting of wooden boards", 1998, pp. 490-508.*
Stern et al, "Computer Optimization of Cutting Yield from Multiple Ripped boards", 1978, pp. 15.*
Herz, "Recursive Computational Procedure for Two-dimensional Stock Cutting", Sep. 1972, pp. 462-469.*
Vasko et al, "A hierarchical approach for one-dimensional cutting stock problems in the steel industry that maximizes yield and minimizes overgrading", 1999, pp. 72-82.*
Optimizecutter.com, "GoNest 2D", Jun. 2014, pp. 36.*
Wayback Machine, "CabinetCut", Mar. 5, 2007, pp. 2.*
International Search Report for PCT/KR2010/001505 dated Sep. 27, 2011.

* cited by examiner

PROCESS FOR PREPARATION OF QUADRANGLE UNIT

FIELD OF THE INVENTION

The present invention relates to a method of manufacturing quadrangular unit pieces, and, more particularly, to a method of cutting one or more kinds of quadrangular unit pieces having a relatively small size from a quadrangular base material having a relatively large size using a cutter frame including a plurality of cutters mounted therein to manufacture the quadrangular unit pieces.

BACKGROUND OF THE INVENTION

Technology for cutting a quadrangular base material having a relatively large size to manufacture a plurality of quadrangular unit pieces having relatively small sizes has been adopted in various fields. For example, a base material sheet having a predetermined width and a long length may be repeatedly cut using a cutter frame having a plurality of cutters mounted therein to simultaneously manufacture a plurality of quadrangular unit pieces though a one-time cutting process.

The cut quadrangular unit pieces may be subjected to an inspection process to check if any of the quadrangular unit pieces are defective. The quadrangular unit pieces found to be defective during the inspection process are sorted as defective products. If a large number of quadrangular unit pieces are found to be defective, material loss is serious.

Defects of the cut quadrangular unit pieces mainly originate in a quadrangular base material (also referred to as a base fabric sheet). Generally, a base fabric sheet may be manufactured by extruding and stretching a predetermined material. The base fabric sheet is very long, and therefore, the base fabric sheet is wound on a roller such that the base fabric sheet is easily handled at the extruding process, at the stretching process, and at a subsequent cutting process. At the stretching process, the base fabric sheet is stretched while opposite ends of the sheet are fixed to a predetermined stretching device, with the result that end regions of the base fabric sheet may be defective. At the winding process, the end region of the base fabric sheet fixed to the roller may be defective. Also, if the roller has scratches, periodic defects may occur at the base fabric sheet contacting the roller during the rotation of the roller.

In a case in which quadrangular unit pieces are cut from a base fabric sheet having such defects, defective quadrangular unit pieces may be disposed of, and therefore, manufacturing costs may be increased.

There is known technology relating to apparatuses for manufacturing quadrangular unit pieces that are capable of reducing defects of the quadrangular unit pieces to solve the above problems.

As an example of such technology, there is known technology for checking whether a quadrangular unit piece slit in the longitudinal direction is defective using an inspection unit and, upon checking that the quadrangular unit piece is defective, transferring the defective quadrangular unit piece to a cutting unit to cut and remove the defective quadrangular unit piece. In this technology, however, a large amount of scrap is produced. When quadrangular unit pieces are successively arranged, process continuity is seriously deteriorated. Also, when quadrangular unit pieces having various sizes are simultaneously cut from a base material and/or the quadrangular unit pieces are cut from the base material at a predetermined inclination, as will be described hereinafter, practical applicability may be substantially difficult.

Specifically, the size (width) of the base material is specified, whereas the size of the quadrangular unit pieces may vary as needed, due to various factors, such as the limitation of base material suppliers, the efficiency aspect of the manufacturing process, and the fluctuation in demand of the quadrangular unit pieces. In this case, the cutting efficiency greatly varies depending upon in which structure the cutter frame is configured, i.e., in which structure cutters for cutting the quadrangular unit pieces from the base material are arranged, when cutting a plurality of desired quadrangular unit pieces based on the size of the base material. The low cutting efficiency increases the amount of scrap, produced from the base material, which will be disposed of after the cutting process, with the result that eventually, the manufacturing costs of the quadrangular unit pieces are increased.

When the size (width and length) of a base material is in constant proportion to the size (lateral length and longitudinal length) of specific quadrangular unit pieces, it is possible to minimize a cutting loss rate by sequentially arranging the quadrangular unit pieces such that the quadrangular unit pieces are brought into contact with one another at positions having such constant proportion. However, when such constant proportion is not formed, the cutting loss rate may vary depending upon the array structure of the quadrangular unit pieces. Furthermore, when the quadrangular unit pieces are to be cut at a predetermined angle to the longitudinal direction of the base material, a large amount of scrap is inevitably produced.

An example of a process of arranging quadrangular unit pieces on an imaginary frame at a predetermined inclination is illustrated in FIG. 1. Specifically, FIG. 1 illustrates a process of locating quadrangular unit pieces having a relatively small size at an imaginary quadrangular coordinate system corresponding to a cutting frame which cuts the quadrangular unit pieces from the base material to set the arrangement of cutters in the cutting frame.

Referring to FIG. 1, quadrangular unit pieces 20 are inclined at an angle of 45 degrees in an imaginary quadrangular coordinate system 10 of a cutting frame. The number of cases in which the quadrangular unit pieces 20 are arranged in the imaginary quadrangular coordinate system 10 without overlap may be large. For example, the position of a first quadrangular unit piece 20 may be specified, and then the position of a second quadrangular unit piece 21 may be set. The same process may be repetitively carried out with respect to a plurality of quadrangular unit pieces including a third quadrangular unit piece 22.

It is generally preferable to arrange the quadrangular unit pieces 20, 21 and 22 such that the quadrangular unit pieces 20, 21 and 22 are adjacent to one another to manufacture a cutting frame having a high cutting rate (or a low cutting loss rate). For example, the first quadrangular unit piece 20 may be located such that two vertices of the first quadrangular unit piece 20 contact the outer circumference of the imaginary quadrangular coordinate system 10. In this state, the second quadrangular unit piece 21 may be located at various positions such that the second quadrangular unit piece 21 contacts one side of the first quadrangular unit piece 20. In the same manner, the third quadrangular unit piece 22 may be located at various positions such that the second quadrangular unit piece 21 contacts one side of the first quadrangular unit piece 20 and/or the second quadrangular unit piece 21 after the location of the second quadrangular unit piece 21. This process is repetitively carried out with respect to a maximum number of quadrangular unit pieces 20, 21 and 22 under a condition in which the quadrangular unit pieces 20, 21 and 22 are included in the imaginary quadrangular coordinate system 10.

Although an array structure having the maximum cutting rate is obtained through the above process, however, a plurality of defective quadrangular unit pieces may be obtained due to defects of the quadrangular unit pieces when the quadrangular unit pieces are cut to produce real products.

Consequently, there is a high necessity for technology relating to a method of manufacturing quadrangular unit pieces that is capable of efficiently calculating the number of cases in which good-quality products can be manufactured to reduce a defect rate of products at a continuous mass production process and reducing a defect rate of products even when cutting the quadrangular unit pieces from a base material at a predetermined inclination, thereby preventing waste and reducing manufacturing costs of the quadrangular unit pieces.

SUMMARY OF THE INVENTION

Therefore, the present invention has been made to solve the above problems, and other technical problems that have yet to be resolved.

Specifically, it is an object of the present invention to provide a method of manufacturing quadrangular unit pieces that is capable of inspecting defects of a quadrangular base material using an inspection device, calculating a yield when imaginarily cutting quadrangular unit pieces from the quadrangular base material using a plurality of virtual cutting frames, selecting one of the virtual cutting frames providing the maximum yield, and cutting quadrangular unit pieces from the quadrangular base material using a cutting frame corresponding to the selected virtual cutting frame to manufacture the quadrangular unit pieces, thereby improving a good-quality product rate of the quadrangular unit pieces and reducing manufacturing costs of the quadrangular unit pieces.

It is another object of the present invention to provide a method of manufacturing quadrangular unit pieces that is capable of setting the optimum cutting positions of a quadrangular base material in consideration of defect positions of the quadrangular base material using even a single cutting frame, thereby further improving the effect as described above.

It is a further object of the present invention to provide an apparatus for manufacturing quadrangular unit pieces that is capable of carrying out the above method of manufacturing the quadrangular unit pieces.

In accordance with one aspect of the present invention, the above and other objects can be accomplished by the provision of a method of cutting one or more kinds of quadrangular unit pieces having a relatively small size from a quadrangular base material having a relatively large size using a cutter frame including a plurality of cutters to manufacture the quadrangular unit pieces, the method including (a) an inspection step of scanning a quadrangular base material in a longitudinal direction and in a lateral direction of the quadrangular base material to check positions of defects on the quadrangular base material, (b) a calculation step of calculating a yield when imaginarily cutting the quadrangular base material using two or more kinds of virtual cutting frames, (c) a selection step of selecting one of the virtual cutting frames in which the yield calculated at the calculation step (b) is within a range of upper 30%, and (d) a manufacturing step of cutting the quadrangular base material using a cutting frame corresponding to the virtual cutting frame selected at the selection step (c) to manufacture quadrangular unit pieces.

As previously described, there is necessity for manufacturing quadrangular unit pieces having different sizes due to various factors, such as demand for products, and therefore, various kinds of cutting frames are designed. That is, various kinds of cutting frames may be prepared to flexibly cope with demand of products. On the other hand, quadrangular base materials may have defects of different patterns. For this reason, product efficiency may be greatly changed depending upon a quadrangular base material to be cut using even a specific cutting frame.

According to the present invention, it is possible to set an imaginary cutting state when using virtual cutting frames with respect to a specific quadrangular base material having an inherent defect pattern in consideration of the above relationship between the virtual cutting frames and the quadrangular base material, thereby selecting the virtual cutting frame exhibiting the optimum cutting efficiency without real cutting of the quadrangular base material.

Here, the term "optimum cutting efficiency" means the most preferable cutting efficiency when synthetically considering a cutting rate, a yield of good-quality products, a demand degree of quadrangular unit pieces based on the sizes thereof, and states of the respective cutting frames. Consequently, a cutting frame that is capable of simultaneously satisfying other points to be duly considered while providing a yield of products within a predetermined range may be selected with respect to a specific quadrangular base material.

Specifically, ranking of the virtual cutting frames is decided based on yields of the virtual cutting frames, virtual cutting frames having yields within a range of upper 30% from the maximum yield are included, and one of the included virtual cutting frames is selected in consideration of various points to be duly considered.

Cutting frames having yields out of upper 30% may not be preferable although other points are preferable since the amount of scrap, produced from the base material, which will be disposed of after the cutting process, is large.

In order to manufacture quadrangular unit pieces at high productivity while minimizing a defect rate of products, the selection step (c) may include selecting one of the virtual cutting frames providing the maximum yield.

Each of the virtual cutting frames may be configured in a structure in which a plurality of cutters are mounted to cut a plurality of quadrangular unit pieces from a base material. Each of the virtual cutting frames may be formed approximately in a quadrangular shape.

The kind of the cutters is not particularly restricted so long as the cutters exhibit the structure or properties to cut the quadrangular unit pieces from the base material. Typically, each of the cutters may be a knife for cutting, such as a metal knife or a jet water knife, or a light source for cutting, such as a laser.

As described above, the cutting frames used in the present invention may be two or more kinds of cutting frames. For example, the cutting frames may be different in cutter array from each other, the cutting frames may be different in cutter size from each other, or the cutting frames may be different in cutter array and cutter size from each other. Consequently, when a specific quadrangular base material is cut using the respective cutting frames, a yield may be generally changed.

At the calculation step (b) of the present invention, a yield when imaginarily cutting a specific quadrangular base material using the virtual cutting frames may be calculated.

Here, a yield may be defined, for example, as a ratio of good-quality quadrangular unit pieces to the entire area of a quadrangular base material when quadrangular unit pieces are cut from the quadrangular base material using a cutting frame. However, a criterion thereof may be changed as needed.

As an example, a yield may be calculated by product of a cutting rate (efficiency when imaginarily cutting a quadrangular base material) and a good-quality product rate (a ratio of the number of no defective quadrangular unit pieces to the number of quadrangular unit pieces imaginarily cut by the virtual cutting frames at the cutting rate).

A virtual cutting frame having a high yield is decided through the calculation step, and the virtual cutting frame having the high yield is selected prior to cutting. Consequently, it is possible to minimize the amount of scrap produced from the quadrangular base material after cutting of the quadrangular base material and to reduce manufacturing costs of the quadrangular unit pieces with the respect to the same quadrangular base material.

The quadrangular unit pieces may be cut from the quadrangular base material in various forms. For example, the quadrangular unit pieces may be cut from the quadrangular base material at a predetermined inclination angle (θ) to the quadrangular base material.

The inclination angle (θ) may be changed based on the use of the quadrangular unit pieces. For example, the inclination angle (θ) may be 45 degrees or 135 degrees based on the lower end of the quadrangular base material. Alternatively, the inclination angle (θ) may be 0 degrees or 90 degrees based on the lower end of the quadrangular base material.

Generally, a cutting frame has a smaller width than that of a quadrangular base material. That is, the upper end region and the lower end region of the quadrangular base material out of the width of the cutting frame may be disposed of as scrap. In order to increase a yield, therefore, it is preferable to arrange the quadrangular unit pieces (specifically, it is preferable to arrange the cutters in the cutting frame) such that the width of the quadrangular base material is maximally utilized. On the other hand, defects of the quadrangular base material may cause results contrary to the above arrangement.

Although the defects may occur randomly according to a treatment level of the quadrangular base material, the defects may be mainly located at the left side end of the quadrangular base material in the longitudinal direction of the quadrangular base material where the quadrangular base material is fixed to a roller such that the quadrangular base material is wound on the roller and/or opposite ends of the quadrangular base material in the lateral direction of the quadrangular base material where the quadrangular base material is fixed to a stretching device. However, the defects do not uniformly occur at the above regions, but the above regions have a relatively high distribution of defects.

Preferably, therefore, the method of manufacturing the quadrangular unit pieces may further include a cutting step of cutting the quadrangular base material in a state in which the virtual cutting frames are imaginarily moved in the longitudinal direction and/or in the lateral direction of the quadrangular base material, the cutting step being carried out prior to the selection step (c).

In consideration of defect distribution of the quadrangular base material, it is possible to space the cutting frames apart from a cutting start end of the quadrangular base material by a predetermined distance or to space the cutting frames apart from the upper end or the lower end of the quadrangular base material at predetermined intervals in regular sequence.

That is, the virtual cutting frames may be imaginarily moved to positions where the defect distribution is low, and therefore, it is possible to cut a relatively large number of good-quality quadrangular unit pieces.

It is preferable to imaginarily move the virtual cutting frames from the cutting start end of the quadrangular base material to a position excluding a region in which defect distribution in the longitudinal direction of the quadrangular base material is relatively high in consideration of defect distribution on the quadrangular base material in the longitudinal direction thereof. The cutting start end of the quadrangular base material may be, for example, the end region of the quadrangular base material fixed to a roller during a winding process.

When the virtual cutting frames are imaginarily moved such that the virtual cutting frames are spaced apart from the upper end or the lower end of the quadrangular base material at predetermined intervals in regular sequence, as described above, it is possible to imaginarily move the virtual cutting frames at movement intervals of 0.1 to 5%, more preferably 0.2 and 5 cm, of the width of the quadrangular base material.

As described above, therefore, it is possible to increase the yield through the movement of the cutting frames such that the cutting frames are spaced apart from the quadrangular base material at the predetermined intervals in regular sequence, thereby increasing a probability of manufacturing good-quality quadrangular unit pieces.

Meanwhile, defect distribution of the quadrangular base material in the lateral direction of the quadrangular base material may be changed in the longitudinal direction of the quadrangular base material due to various causes. For example, on the assumption that the total length of the base material is 100, a relatively large number of defects are mainly distributed at the upper end of the base material at the first 30 portion of the base material, a relatively large number of defects are mainly distributed at the lower end of the base material at the next 40 portion of the base material, and a relatively large number of defects are mainly distributed at the upper end of the base material at the final 30 portion of the base material, as depicted in FIG. 8.

Therefore, it is preferable to move the virtual cutting frame to a position in which the yield is maximized in the lateral direction of the quadrangular base material and to cut the quadrangular base material when the yield is changed in the longitudinal direction of the quadrangular base material at the manufacturing step (d).

At this time, the virtual cutting frame may be moved to a position of the quadrangular base material where defect distribution is low in the lateral direction of the quadrangular base material. It is preferable to move the virtual cutting frame in the lateral direction of the quadrangular base material when yield deviation is 20% or more.

In consideration of manufacturing efficiency of the quadrangular unit pieces, however, it is preferable to move the virtual cutting frame in the lateral direction of the quadrangular base material three times or less based on the longitudinal direction of the quadrangular base material.

In the method of manufacturing the quadrangular unit pieces according to the present invention, the quadrangular base material is a continuous material having a predetermined width and a relatively long length, and the cutters are arranged in a structure to repetitively cut the quadrangular base material by a predetermined length.

That is, the quadrangular base material is cut using the decided virtual cutting frame having the maximum yield, and therefore, it is possible to improve productivity of the quadrangular unit pieces.

Various quadrangular base materials may be used in the present invention. For example, the quadrangular base material may be a film comprising a layer ('an absorption layer or a transmission layer') that absorbs or transmits only a specific-direction wave motion of light or an electromagnetic wave in the longitudinal direction thereof or in the lateral direction thereof.

In accordance with another aspect of the present invention, there is provided an apparatus for manufacturing quadrangular unit pieces.

Specifically, the present invention provides an apparatus for cutting one or more kinds of quadrangular unit pieces having a relatively small size from a quadrangular base material having a relatively large size to manufacture the quadrangular unit pieces, the apparatus including an inspection device for scanning the quadrangular base material in a longitudinal direction and in a lateral direction of the quadrangular base material to check positions of defects on the quadrangular base material, a database for storing information on two or more virtual cutting frames, a calculation device for calculating a yield when imaginarily cutting the quadrangular base material using the virtual cutting frames based on the information from the inspection device and the database, a plurality of cutters for cutting a plurality of quadrangular unit pieces from the quadrangular base material, a cutting frame in which the cutters are mounted in a form corresponding to the quadrangular unit pieces, and a position adjustment device for moving the cutting frame in which the cutters are mounted on the quadrangular base material.

Consequently, the apparatus for manufacturing the quadrangular unit pieces according to the present invention is capable of deciding a specific one of the virtual cutting frames having a high yield range through the inspection device for checking the defects of the quadrangular base material, the database for storing information on the virtual cutting frames, and the calculation device for calculating a yield when imaginarily cutting the quadrangular base material using the virtual cutting frames based on the information from the inspection device and the database.

Also, the position adjustment device moves the cutting frame to a position of the quadrangular base material where a small number of defects are distributed. Consequently, it is possible to rapidly move the cutting frame based on defect positions during mass production, thereby minimizing a defect rate of the quadrangular unit pieces and greatly improving manufacturing efficiency.

The kind of the inspection device is not particularly restricted as long as the inspection device can scan the quadrangular base material to check defects of the quadrangular base material. For example, the inspection device may be a high-performance camera.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
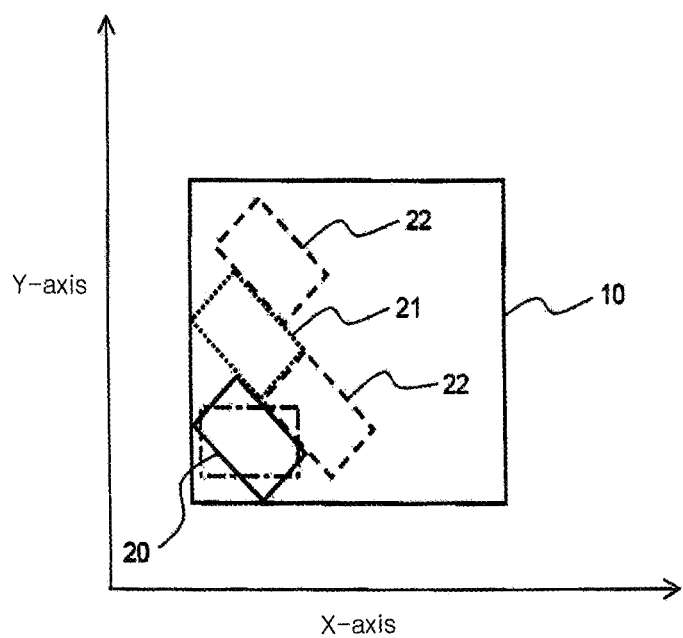
FIG. 1 is a typical view illustrating an example of a process of arranging quadrangular unit pieces on an imaginary frame at a predetermined inclination.
Figure 2:
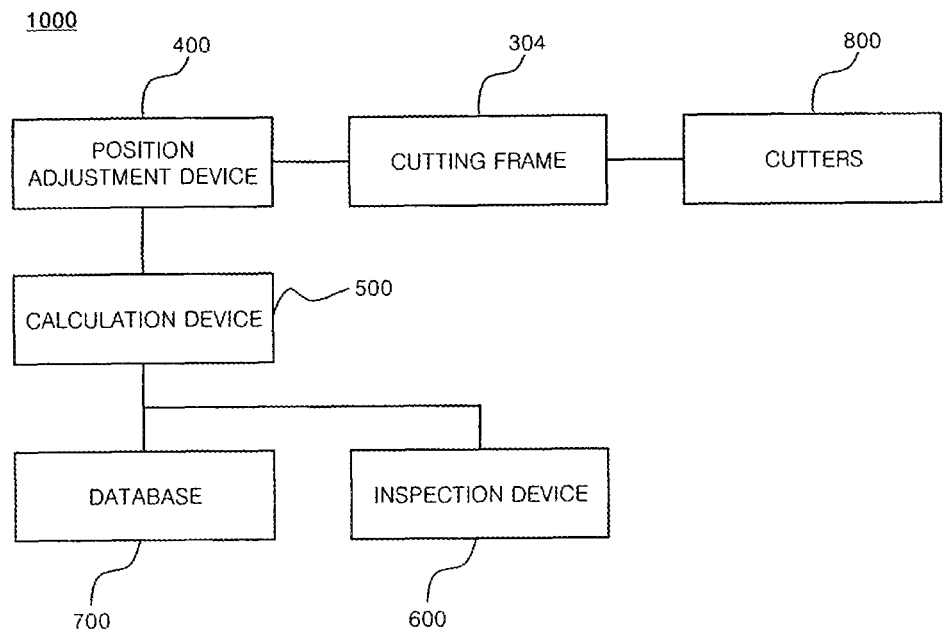
FIG. 2 is a construction view illustrating an apparatus for manufacturing quadrangular unit pieces according to an embodiment of the present invention.
Figure 3:
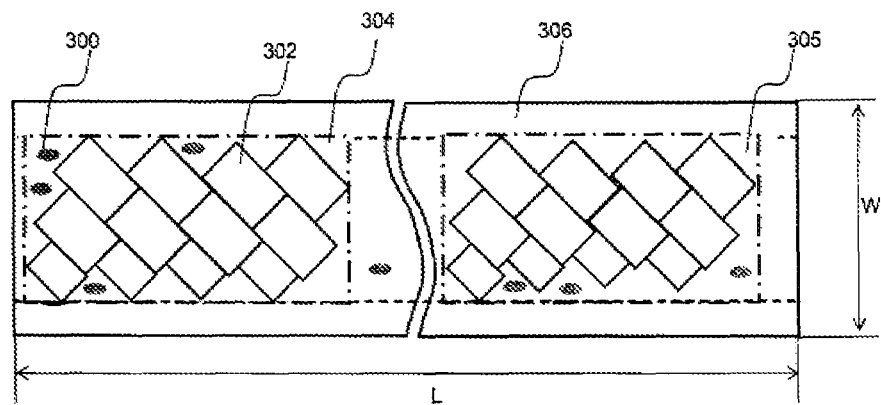
FIG. 3 is a typical view illustrating a method of cutting the quadrangular unit pieces of FIG. 2.

FIG. 2 is a construction view typically illustrating an apparatus for manufacturing quadrangular unit pieces according to an embodiment of the present invention, and FIG. 3 is a typical view illustrating an example of a method of cutting the quadrangular unit pieces of FIG. 2.

Referring to these drawings, an apparatus 1000 for manufacturing quadrangular unit pieces includes a plurality of cutters 800 for cutting a plurality of quadrangular unit pieces 302 from a quadrangular base material 306, a plurality of cutting frames 304 in each of which the cutters 800 are mounted in a form corresponding to the quadrangular unit pieces 302, an inspection device 600 for scanning the quadrangular base material 306 in the longitudinal direction (L) and in the lateral direction (W) of the quadrangular base material 306 to check the positions of defects 300 on the quadrangular base material 306, a database for storing information on virtual cutting frames corresponding to the cutting frames 304, a calculation device 500 for calculating a yield when imaginarily cutting the quadrangular base material 306 using virtual cutting frames corresponding to the respective cutting frames 304 based on the information from the inspection device 600 and the database 700, and a position adjustment device 400 for moving the cutting frames 304 in each of which the cutters 800 are mounted to positions where a small number of defects are distributed on the quadrangular base material 306.

Figure 4:
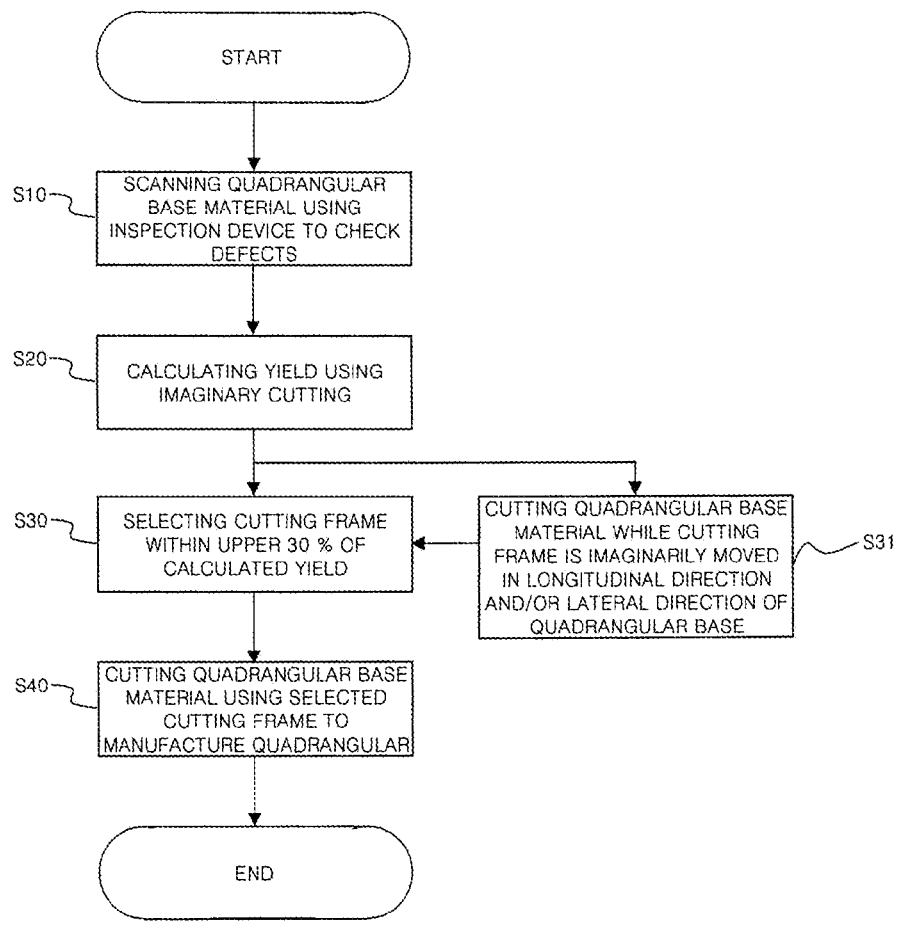
FIG. 4 is a flow chart illustrating a method of manufacturing the quadrangular unit pieces of FIGS. 2 and 3.

FIG. 4 is a flow chart illustrating a method of manufacturing the quadrangular unit pieces of FIGS. 2 and 3.

Referring to FIG. 4 together with FIGS. 2 and 3, the method of manufacturing the quadrangular unit pieces includes an inspection step of scanning a quadrangular base material 306 in the longitudinal direction (L) and in the lateral direction (W) of the quadrangular base material 306 using the inspection device to check the positions of defects 300 on the quadrangular base material 306 (S10), a calculation step of calculating a yield when imaginarily cutting the quadrangular base material 306 using virtual cutting frames corresponding to two or more kinds of cutting frames 304 (S20), a selection step of selecting one of the cutting frames 304 corresponding to the virtual cutting frame in which the yield calculated at the calculation step (S20) is within a range of upper 30% (S30), and a manufacturing step of cutting the quadrangular base material 306 using the cutting frame 304 selected at the selection step (S30) to manufacture quadrangular unit pieces 302.

Prior to the selection step (S30), a cutting step of cutting the quadrangular base material 306 in a state in which virtual cutting frames corresponding to the cutting frames 304 are imaginarily moved in the longitudinal direction (L) and in the lateral direction (W) of the quadrangular base material 306 may be further carried out.

Figure 5:
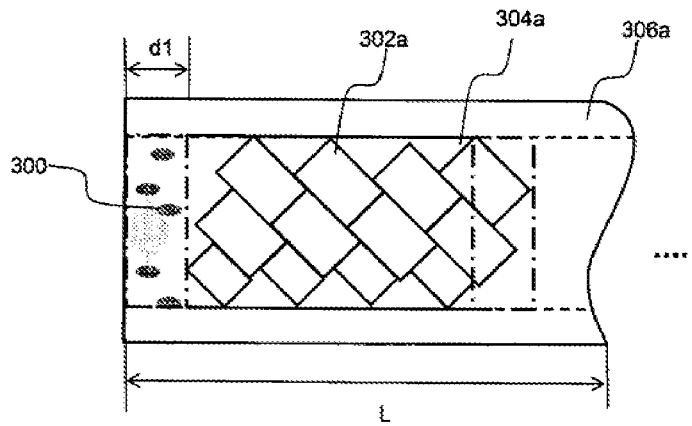
FIG. 5 is a typical view illustrating that a virtual cutting frame is imaginarily moved in the longitudinal direction (L) at a calculation step (S31) of FIG. 4.

FIG. 5 is a typical view illustrating that a virtual cutting frame is imaginarily moved in the longitudinal direction (L) at the calculation step (S31) of FIG. 4.

Referring to FIG. 5, a virtual cutting frame 304a is imaginarily moved from a cutting start end of a quadrangular base material 306a to a position excluding a region in which defect distribution in the longitudinal direction (L) of the quadrangular base material 306a is relatively high by a predetermined distance d1 in consideration of defect distribution on the quadrangular base material 306a in the longitudinal direction (L) thereof.

Figure 6:
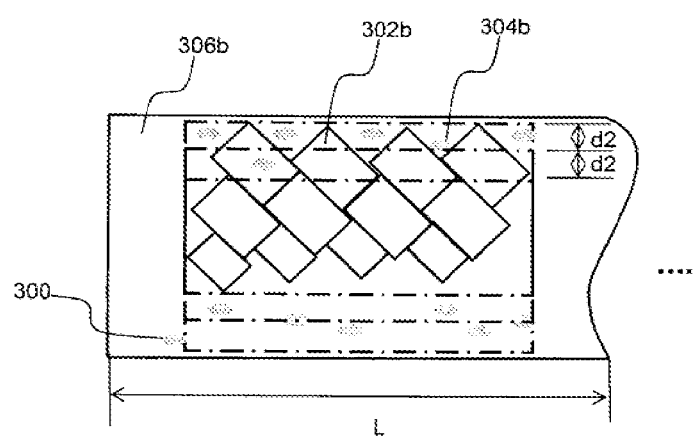
FIG. 6 is a typical view illustrating that a virtual cutting frame is imaginarily moved in the lateral direction (W) at the calculation step (S31) of FIG. 4.

FIG. 6 is a typical view illustrating that a virtual cutting frame is imaginarily moved in the lateral direction (W) at the calculation step (S31) of FIG. 4.

Referring to FIG. 6, a virtual cutting frame 304b is imaginarily moved from the upper end of a quadrangular base material 306b at predetermined intervals d2 of approximately 1 cm in regular sequence. Yields at the respective positions to which the virtual cutting frame 304b is moved are calculated to obtain one of the positions having the maximum yield.

Figure 7:
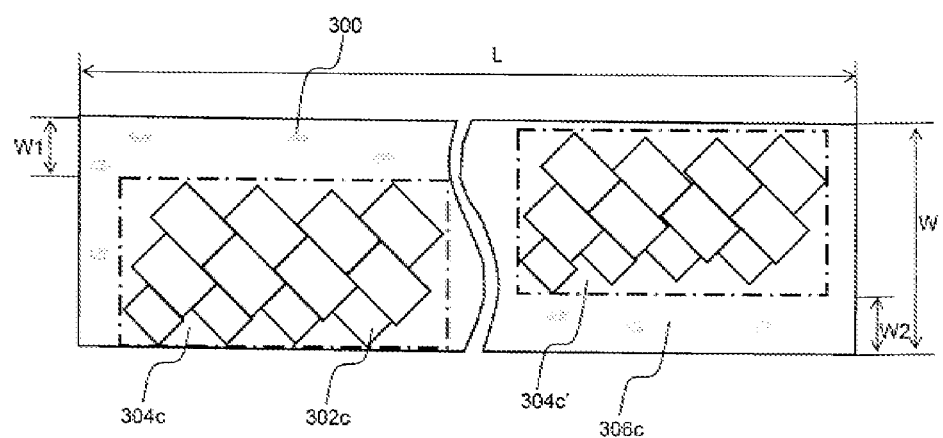
FIG. 7 is a typical view illustrating a method of manufacturing quadrangular unit pieces with the maximum yield in consideration of positions of defects according to an embodiment of the present invention.
Figure 8:
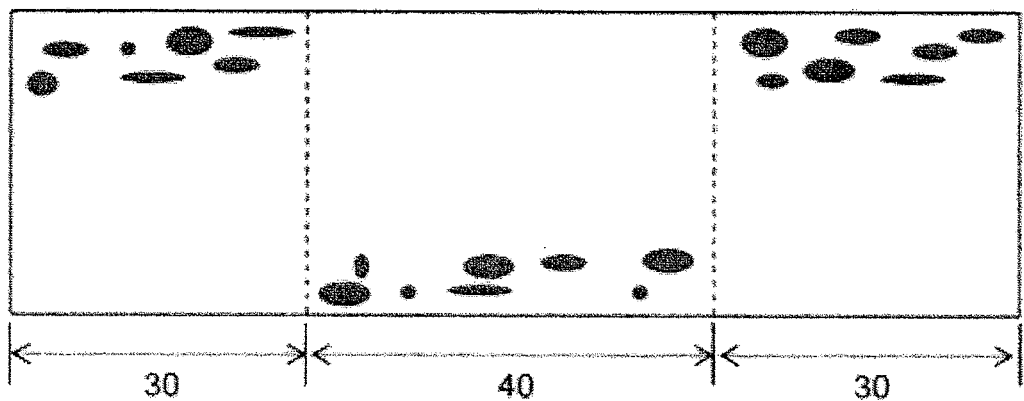
FIG. 8 depicts base material having defects in different regions.

FIG. 7 is a typical view illustrating a method of manufacturing quadrangular unit pieces with the maximum yield according to an embodiment of the present invention.

Referring to FIG. 7, when a yield is changed in the longitudinal direction (L) of a quadrangular base material 306c at the calculation step (S30) of FIG. 4, a cutting frame 304c is moved to a position in which the yield is maximized in the lateral direction (W) of the quadrangular base material 306c and cuts the quadrangular base material 306c at the manufacturing step (S40) of FIG. 4.

Specifically, when a yield deviation is 20% or more, the cutting frame 304c located at the lower end of the quadrangular base material 306c is moved to the upper end of the quadrangular base material 306c (304c') to manufacture quadrangular unit pieces.

It is preferable for the cutting frame 304c to be moved in the lateral direction (W) of the quadrangular base material 306c three times or less based on the longitudinal direction (L) of the quadrangular base material 306c.

Consequently, the cutting frame 304c having cutters are mounted therein is moved to a position in which a relatively small number of defects checked using the inspection device are distributed on the quadrangular base material 306c and cuts the quadrangular unit pieces 302, thereby manufacturing a large number of good-quality quadrangular unit pieces.

INDUSTRIAL APPLICABILITY

As is apparent from the above description, the method of manufacturing the quadrangular unit pieces according to the present invention has the effect of setting an imaginary cutting state when using the respective cutting frames with respect to a specific quadrangular base material having an inherent defect pattern in consideration of a relationship between the cutting frames and the quadrangular base material, thereby selecting the cutting frame exhibiting the optimum cutting efficiency without real cutting of the quadrangular base material. Also, the method of manufacturing the quadrangular unit pieces according to the present invention has the effect of cutting the quadrangular unit pieces using the selected cutting frame, thereby providing high productivity while minimizing a defect rate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of cutting one or more kinds of quadrangular unit pieces having a relatively small size from a quadrangular base material having a relatively large size using a cutter frame comprising a plurality of cutters to manufacture the quadrangular unit pieces, the method comprising:
    an inspection step of scanning a quadrangular base material in a longitudinal direction and in a lateral direction of the quadrangular base material to check positions of defects on the quadrangular base material;
    a first calculation step of calculating a first yield when imaginarily cutting the quadrangular base material using two or more kinds of virtual cutting frames set at a first position that includes the defects;
    a selection step of selecting one of the virtual cutting frames;
    a second calculation step of calculating a second yield at a second position by moving the selected virtual cutting frame in the lateral or longitudinal direction from the first position to the second position, wherein the virtual cutting frame is set in the lateral or longitudinal direction from the first position to the second position when an increase in yield is 20% or more;
    a manufacturing step of cutting the quadrangular base material using a cutting frame corresponding to the virtual cutting frame selected at the selection step and set at the first or second position having the highest efficiency to manufacture quadrangular unit pieces.

2. The method according to claim 1, wherein the selection step comprises selecting one of the virtual cutting frames providing a maximum yield.

3. The method according to claim 1, wherein each of the cutters is a knife for cutting or a light source for cutting.

4. The method according to claim 3, wherein the knife for cutting is a metal knife or a jet water knife, and the light source for cutting is a laser.

5. The method according to claim 1, wherein, at the calculation step, the respective virtual cutting frames are different from each other in terms of cutter arrangement or cutter size.

6. The method according to claim 1, wherein the quadrangular unit pieces are cut from the quadrangular base material at a predetermined inclination angle ($\theta$) to the quadrangular base material.

7. The method according to claim 6, wherein the inclination angle ($\theta$) is 45 degrees or 135 degrees based on a lower end of the quadrangular base material.

8. The method according to claim 6, wherein the inclination angle ($\theta$) is 0 degrees or 90 degrees based on a lower end of the quadrangular base material.

9. The method according to claim 1, further comprising an imaginary cutting step of cutting the quadrangular base material in a state in which the virtual cutting frames are imaginarily moved in the longitudinal direction or in the lateral direction of the quadrangular base material based on the positions of the defects, the imaginary cutting step being carried out prior to the selection step.

10. The method according to claim 9, wherein the imaginary movement of the virtual cutting frames comprises spacing the virtual cutting frames apart from a cutting start end of the quadrangular base material by a predetermined distance.

11. The method according to claim 10, further comprising imaginarily moving the virtual cutting frames from the cutting start end of the quadrangular base material to a position excluding a region in which defect distribution in the longitudinal direction of the quadrangular base material is relatively high in consideration of defect distribution on the quadrangular base material in the longitudinal direction thereof.

12. The method according to claim 9, wherein the imaginary movement of the virtual cutting frames comprises spacing the virtual cutting frames apart from an upper end or a lower end of the quadrangular base material at predetermined intervals in regular sequence.

13. The method according to claim 11, further comprising imaginarily moving the virtual cutting frames at movement intervals of 0.1 to 5% of a width of the quadrangular base material.

14. The method according to claim 11, wherein the predetermined intervals are between 0.2 and 5 cm.

15. The method according to claim 1, wherein the cutting frame is moved three times or less in the lateral direction of the quadrangular base material.

16. The method according to claim 1, wherein the quadrangular base material is a continuous material having a predetermined width and a relatively long length, and the cutters are arranged in a structure to repetitively cut the quadrangular base material by a predetermined length.

17. The method according to claim 1, wherein the quadrangular base material is a film comprising a layer—that absorbs or transmits only a specific-direction wave motion of light or an electromagnetic wave in the longitudinal direction thereof or in the lateral direction thereof.

18. An apparatus for cutting one or more kinds of quadrangular unit pieces having a relatively small size from a quadrangular base material having a relatively large size to manufacture the quadrangular unit pieces, the apparatus comprising:

an inspection device scanning the quadrangular base material in a longitudinal direction and in a lateral direction of the quadrangular base material to check positions of defects on the quadrangular base material;

a database storing information on two or more virtual cutting frames;

a calculation device calculating a yield when imaginarily cutting the quadrangular base material using each of the virtual cutting frames based on the information from the inspection device and the database, the calculation device calculating a first yield at a first position that includes the defects and a second yield at a second position using a selected virtual frame, the second position being laterally or longitudinally spaced from the first position, wherein the selected virtual cutting frame is set in the lateral or longitudinal direction from the first position to the second position when an increase in yield is 20% or more;

a plurality of cutters for cutting a plurality of quadrangular unit pieces from the quadrangular base material;

a cutting frame in which the cutters are mounted in a form corresponding to the quadrangular unit pieces; and a position adjustment device moving the cutting frame in which the cutters are mounted on the quadrangular base material;

wherein the cutting frame cuts the quadrangular base material using a cutting frame corresponding to the virtual cutting frame selected at the selection step and set at the first or second position having the highest efficiency to manufacture quadrangular unit pieces.

* * * * *